April 15, 1924.

J. W. PETERS

LAWN MOWER

Filed April 9, 1921

Inventor
John W. Peters,

April 15, 1924.

J. W. PETERS

LAWN MOWER

Filed April 9, 1921

Inventor

John W. Peters

Patented Apr. 15, 1924.

1,490,127

UNITED STATES PATENT OFFICE.

JOHN W. PETERS, OF ROSLYN, NEW YORK.

LAWN MOWER.

Application filed April 9, 1921. Serial No. 459,901.

*To all whom it may concern:*

Be it known that I, JOHN W. PETERS, a citizen of the United States, residing at Roslyn, in the county of Nassau and State of New York, have invented certain new and useful Improvements in Lawn Mowers, of which the following is a disclosure.

My invention relates to self-propelled lawn mowers with distant electric control of the general kind described and claimed in my pending application, Serial No. 449,259, filed March 2, 1921. The principal object of this invention is to simplify and reduce the cost of construction of the mower described in my said application.

The preferred embodiment of my invention is shown in the accompanying drawing in which—

Figure 1:
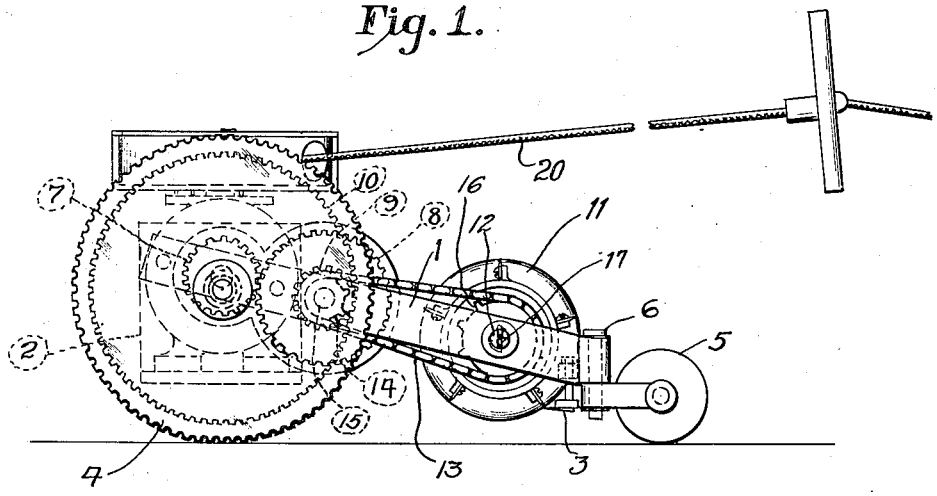
Fig. 1 is a side elevation of the mower.
Figure 2:
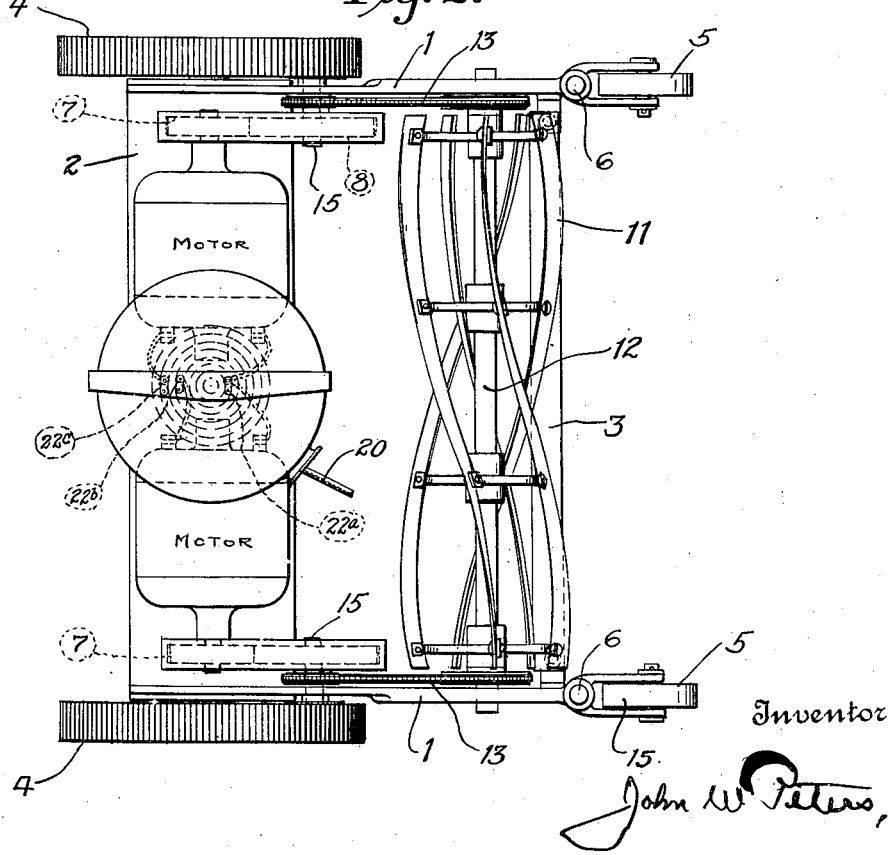
Fig. 2 is a plan view.
Figure 3:
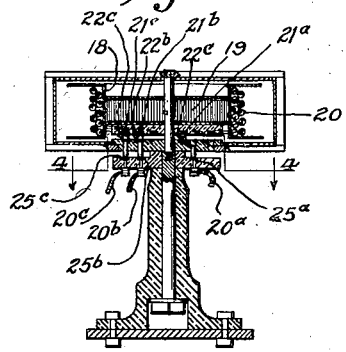
Fig. 3 is a vertical sectional view of the reel.
Figure 4:
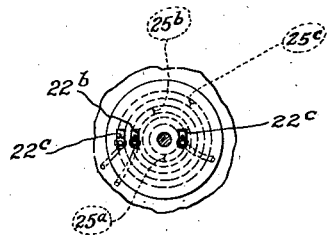
Fig. 4 is a transverse sectional view of the reel taken on the line 4—4 of Fig. 3.
Figure 5:
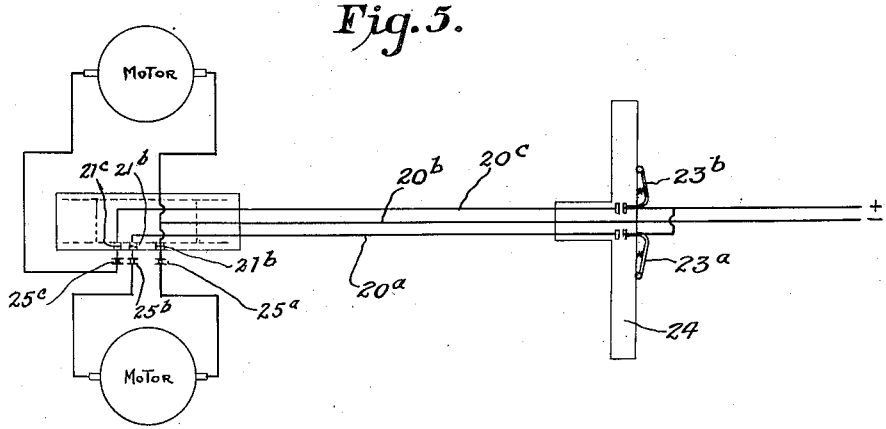
Fig. 5 is a wiring diagram.

Referring in detail to the drawings, the machine comprises a frame consisting of two side bars 1, a transverse member 2 and the cutter bar 3, all connected so as to form a substantially rigid frame. The propelling wheels 4 are mounted at one end of this frame and swiveled supporting wheels 5 are mounted at the other end. The wheels 5 are swiveled or hingedly connected to the frame by pins 6. A separate electric motor is provided for each propelling wheel and is geared to the wheel by gears 7, 8, 9 and 10, the latter being a large internal spur gear. The knife or cutter 11 has the usual shaft 12 journaled at each end in the side frames 1. The cutter is driven by two chains 13 each running on a sprocket 14 fixed to the shaft 15 of gear 8 and on sprocket 16 connected to shaft 12 by ratchets 17 (see Fig. 1). These ratchets allow the chains to drive the cutter, but allow the cutter to run ahead of the chains. Instead of a ratchet any suitable one-way drive mechanism may be employed.

The reel shown is of the horizontal type disclosed in my application Serial No. 449,258 and comprises a drum 18 containing the retracting spring 19. The cable 20, which contains three insulated wires, 20$^a$, 20$^b$ and 20$^c$, is wound on the drum, and the wires are connected to the slip rings 21$^a$, 21$^b$ and 21$^c$. Brushes 22$^a$, 22$^b$ and 22$^c$ contact with these slip rings, and extensions on the lower end of the brushes contact with the slip rings 25$^a$, 25$^b$ and 25$^c$, and the current is taken from these slip rings to the motors, there being a supply conductor 20$^a$ and 20$^c$ to each motor and a common return 20$^b$. The switches 23$^a$ and 23$^b$, located on the handle 24, give the operator individual control over the motors. By stopping one motor and running the other the machine can be turned and steered as desired. When power is applied to both motors the machine tends to follow a straight line, and since both motors are geared to the cutter, any slight inequality in the power of the motors, which should preferably be series wound, will not cause the machine to depart from such straight line.

As practical instructions to those constructing the device, it should be stated that I have found two motors, each developing one-eighth horse power and weighing about 12 pounds each, suitable for driving a machine having a cutter 17 inches long.

Having now described my invention, what I claim is:

1. A self-propelled lawn mower comprising two propelling wheels and one or more swiveled supporting wheels, a cutter, a separate motor connected to each wheel, power transmitting means arranged to drive in one direction only and extending from each motor to the cutter and an extended cable and suitable switches for individually and separately starting and stopping the motors.

2. A self-propelled lawn mower comprising two propelling wheels and one or more supporting wheels, a cutter, a separate motor connected to each wheel, power transmitting means arranged to drive in one direction only and extending from each motor to the cutter and an extended cable and suitable switches for individually and separately starting and stopping the motors.

JOHN W. PETERS.